Oct. 19, 1965     H. K. DUKE     3,212,246

ROTARY MOWER ATTACHMENT

Filed April 1, 1964

INVENTOR.
Howard K. Duke
BY
Lazo & Barry
Attorneys

United States Patent Office 3,212,246
Patented Oct. 19, 1965

3,212,246
ROTARY MOWER ATTACHMENT
Howard K. Duke, P.O. Box 214, Montrose, Ark.
Filed Apr. 1, 1964, Ser. No. 356,563
4 Claims. (Cl. 56—25.4)

This invention relates to rotary mowers and more particularly to the combination with a rotary mower of an attachment for such mowers to relieve adverse operating conditions for the operator.

Hand operated power mowers, though they have been designed to simplify the cutting of grass, still require considerable effort on the part of the operator in their operation. In the warmer climates or during the warmer times of the year, the operating condition for the operator often becomes unbearable either because of the heat or a result of large numbers of insects. The principal object of the present invention is to improve these operating conditions for the operator of a power mower.

This object is accomplished by mounting an attachment on the top of the power source for a mower and driving the attachment through the drive shaft of the mower. A fan blade is mounted on this shaft to produce a draft of air upward from the top of the mower. A fan housing is used to turn this draft through substantially 90° back towards the operator so that it blows directly on him. A circumferential inlet is provided around the periphery of the housing and is properly guarded to prevent drawing any of the exhaust fumes or particles of cut grass into the fan. A control element is postioned at the outlet of the fan housing to control the velocity of air leaving the housing according to the needs of the operator. The force of this draft has been found to be of sufficient velocity to discourage insects, such as mosquitoes, from landing on the operator. The extension of the drive shaft of the mower has also been found useful for driving other attachments off of the mower, such as hedge clippers or the like.

Other objects and advantages will become more readily apparent from the following detailed description when read in connection with the accompanying drawings, in which.

Figures 1, 2:
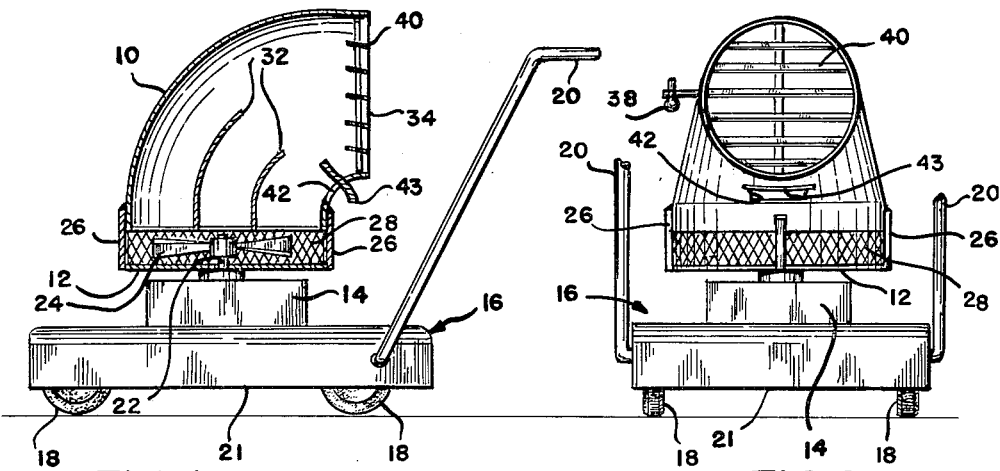
FIG. 1 is a side view of a rotary mower with the fan housing mounted on top and partly broken away to show the interior of the housing.
FIG. 2 is a rear view of the mower.
Figure 3:
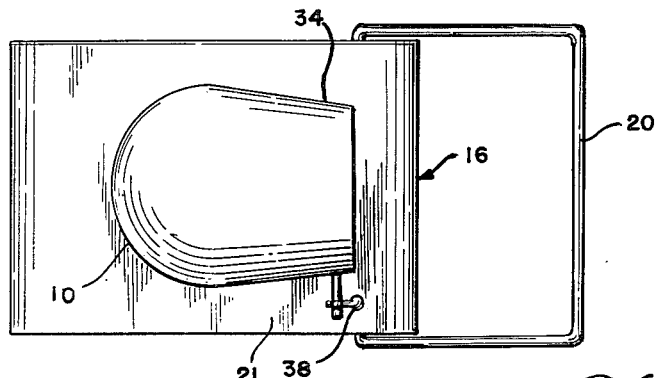
FIG. 3 is a top view of the mower.
Figure 4:
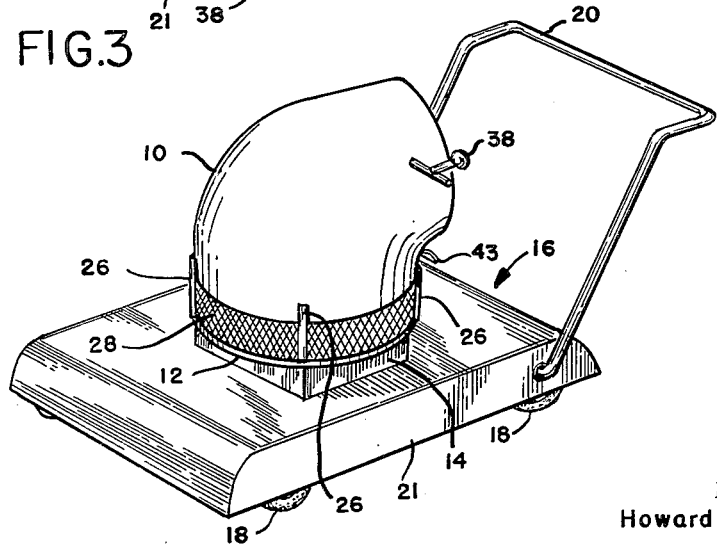
FIG. 4 is a projected view of the mower.

Referring more particularly to the drawings, it can be seen that the housing 10 is mounted on a plate 12 which is secured to the upper portion of the power source or motor 14 of the rotary mower 16. A rotary cutter blade is located within the housing 16 of the mower, and is spaced from the ground by wheels 18. The rotary mower is started in the conventional manner and pushed from a handle 20 which extends upward from the housing 21 to the rear of the mower.

The drive shaft 22 of the motor is extended upward through the top of the motor housing into the fan housing. A bearing (not shown) may be provided in the top of the housing to hold the shaft in a fixed position on the top of the housing. A fan blade 24 is secured to the end of the motor shaft in a horizontal relation so that it will throw air upward from the mower. The plate 12 is secured to the top of the motor housing and extends outward around the edges to prevent any of the exhaust fumes from the motor from being drawn directly into the fan. The fan housing is mounted on a number of bolts 26 vertically upward a spaced distance from the plate 12 to allow for the admission of air to the fan housing. A screen 28 may be provided around the space to prevent the drawing in of any cut grass into the fan blade.

The fan housing includes a lower section having a diameter equal to the diameter of the plate which narrows down to an outlet 30 which is turned at 90° from the inlet. Baffles 32 may be provided within the housing to produce a smooth flow of air toward outlet 34. A shutter 40 is located within the outlet to control the amount of air which is blown at the operator. The shutter is operated by a handle lever 38 which opens and closes the shutter by rotating the shutter blades from vertical to horizontal positions. A secondary outlet 42 having a baffle 43 may be provided in the side of the housing to direct a small amount of air from the blade downward across the rear portion of housing 21. This will prevent any of the exhaust gases from the power source from rising directly upward. When the mower is started, air which is drawn under the fan is drawn back toward the operator to produce a cooling effect.

The power mower can be quickly and easily converted for hedge cutting use by removing the fan housing and blade from the mower. A flexible drive cable has one end secured to the drive shaft and the other end to a hedgecutting device. This makes it possible to use the hedge cutter in any place where the power mower can be taken. In areas where an electrical supply is remote from the location of the hedge, such as on golf courses or the like, this type of hedge cutter drive system becomes particularly important.

Although only one embodiment of the present invention has been shown and described, it should be apparent that there can be various changes and modifications without departing from the scope of the appended claims.

What is claimed is:

1. An improvement in a pusher type lawn mower having cutting means rotating in a horizontal plane within a mower housing which is supported by a plurality of wheels on opposite sides of said cutting means with said cutting means being spaced from said ground in a cutting position and a pusher type handle located rearward of said housing and vertically spaced upward therefrom, comprising
   fan means located on top of said mower housing and driven by said mower to produce a stream of air and
   a fan housing having annular air inlet means and substantially unrestricted air outlet means for directing said stream of air from said fan means back toward the handle for cooling the operator, said inlet and outlet means being disposed above said mower housing.

2. An improvement according to claim 1 including a secondary outlet in said fan housing for directing air downward along the rear of said mower housing.

3. An improvement in a rotary type lawn mower having a mower housing mounted on wheels located on each side of said mower housing, a pusher type handle located rearward of said mower housing
   a rotary cutting blade mounted for rotary motion within said mower housing in proper spaced relationship to said ground, and
   drive means mounted on said mower housing and being connected to drive said rotary cutting blade, said improvement comprising
   a shaft means connected to rotate with said cutting blade and extending upward from the top of said mower housing,
   a fan blade mounted on said shaft and
   a fan housing having annular air inlet means and substantially unrestricted air outlet means for directing said stream of air from said fan means back toward the handle for cooling the operator, said inlet and outlet means being disposed above said mower housing.

4. An improvement in a rotary type lawn mower according to claim 3 including a secondary outlet means in said fan housing and baffle means within said fan housing for directing a part of the air downward across the back of the mower.

References Cited by the Examiner

UNITED STATES PATENTS

| | | | |
|---|---|---|---|
| 1,123,854 | 1/15 | Craver | 230—249 |
| 2,154,564 | 4/39 | Eisenlohr | 56—25.4 |
| 2,519,936 | 8/50 | Sayre | 56—25.4 X |

FOREIGN PATENTS 555,145  4/58  Canada.

ABRAHAM G. STONE, *Primary Examiner.*

RUSSELL R. KINSEY, *Examiner.*